(12) United States Patent
Scemama

(10) Patent No.: US 6,666,119 B2
(45) Date of Patent: Dec. 23, 2003

(54) SEQUENTIAL LOADING APPARATUS

(75) Inventor: Philippe Scemama, Orvin (CH)

(73) Assignee: LNS S.A., Orvin (CH)

( * ) Notice: Subject to any disclaimer, the term of this patent is extended or adjusted under 35 U.S.C. 154(b) by 55 days.

(21) Appl. No.: 09/853,577

(22) Filed: May 14, 2001

(65) Prior Publication Data

US 2001/0047924 A1 Dec. 6, 2001

(30) Foreign Application Priority Data

May 23, 2000 (EP) ............................................ 00810450

(51) Int. Cl.$^7$ ........................ B23B 21/00; B23B 25/00
(52) U.S. Cl. .......................................... 82/127; 82/163
(58) Field of Search ........................... 82/118, 126, 127, 82/162, 163; 279/111, 126; 414/14, 15, 16, 17, 18, 19, 20; 269/307, 329

(56) References Cited

U.S. PATENT DOCUMENTS

| | | | | |
|---|---|---|---|---|
| 3,703,112 A | * | 11/1972 | Selby ........................... | 29/27 A |
| 3,939,879 A | * | 2/1976 | Tolliver et al. .............. | 140/107 |
| 4,811,640 A | * | 3/1989 | Fritsch ........................ | 269/329 |
| 5,320,009 A | * | 6/1994 | Habegger .................... | 279/132 |
| 5,330,168 A | * | 7/1994 | Enomoto et al. ........... | 269/329 |
| 5,490,548 A | * | 2/1996 | Puranen .................... | 144/209.1 |
| 5,498,113 A | * | 3/1996 | Del Fabro et al. ........ | 198/468.2 |
| 5,970,830 A | * | 10/1999 | von Niederhausern ....... | 414/14 |
| 6,109,151 A | * | 8/2000 | Braun et al. .................. | 82/113 |
| 6,442,447 B1 | * | 8/2002 | Gross .......................... | 700/184 |
| 2001/0008326 A1 | * | 7/2001 | Isogai et al. ................ | 269/329 |

FOREIGN PATENT DOCUMENTS

| | | |
|---|---|---|
| EP | 0 188 849 A1 | 7/1986 |
| EP | 0 559 094 A1 | 9/1993 |

* cited by examiner

Primary Examiner—A. L. Wellington
Assistant Examiner—Brian D. Walsh
(74) Attorney, Agent, or Firm—Oliff & Berridge, PLC

(57) ABSTRACT

An apparatus for sequential loading, by means of a pusher, of bars in a rotating spindle of a machine tool, this loading apparatus comprising a device for alignment of an end of each loaded bar, on the axis of the spindle of the machine tool, the said alignment device itself comprising jaws which, having bearing surfaces able to define a cylindrical support around the bar, are supported by a mechanism allowing their counter-displacements, wherein said mechanism for displacement of the jaws of the apparatus includes:

a drive element,
  a device for control of this drive element, and this as a function of at least one of the parameters which are:
    the diameter of the bar to be loaded in the machine tool,
    the diameter of the pusher in a part capable of being engaged in the jaws,
    the surpassing of a predetermined threshold for vibrations in the bar.

7 Claims, 4 Drawing Sheets

SEQUENTIAL LOADING APPARATUS

This invention relates to an apparatus for sequential loading of bars in a rotating part of a machine tool, in particular by means of a pusher.

Loading apparatuses of this kind are well known by the name of "feeder," and serve the feeding of machine tools with chip removal, these machine tools themselves also being referred to as machining lathes.

Designated by the term "pusher" is the active part of the sequential loading apparatus, i.e. a body which, of predetermined diameter, has an end face intended to rest against one of the ends of the bar to be pushed, on the one hand, and, on the other hand, receives the action of a drive element of displacement in translation along an axis aligned approximately with that of the rotating part.

The invention relates in particular to a sequential loading apparatus for bars in a rotating machine part, this apparatus being of the type having a device for alignment, on the axis of rotation of the rotating part, of the longitudinal axis of at least one portion of the bar situated immediately upstream from this rotating part.

In these machines, the rotating part which receives the bar is conventionally designated "spindle."

These alignment devices are intended to ensure and/or perfect the alignment, with the axis of the spindle, of the longitudinal axis of the portion of the bar which is engaged in this spindle.

In this way, in general, the vibrations caused by the deficiency in straightness of the bars do not spread to the spindle of the machine tool, and the deficiencies in machining which would result from these vibrations can thus be prevented.

In effect, the machining lathes make possible the sequential production of rotary parts whose longitudinal dimension corresponds to a portion of the length of a bar of transverse cross-section compatible with that of the pieces to be made.

In precise terms, each piece is made by machining of at least one portion of the end of a bar which is engaged in the spindle, then cutting of this bar, in particular by truncation, in order to isolate the longitudinal portion that has to make up the piece.

After each machining, the bar is translated in the spindle, under the effect of the pusher of the loading apparatus, to allow a new piece to be made, and this continues until the bar is used up.

Afterwards, a new bar is loaded in the spindle, and the machining cycle can begin again.

Conventionally, an alignment device includes two jaws which, having bearing surfaces able to define a cylindrical support around a bar portion, i.e. on a portion of the length of the latter, are supported by a mechanism allowing opposite displacements of these jaws, i.e. displacements bringing about the spacing apart, or the moving closer together, of the said jaws.

The displacement mechanism is connected to a massive support, such as the structure of the sequential loading apparatus.

The mechanism of displacement of the jaws makes it possible to adjust the position of the said jaws as a function of the diameter of the bar intended to be used in the machine tool.

In the alignment devices known to the applicant, the mechanism for displacement of the jaws is controlled by hand, i.e. a person must intervene to adjust the position of the jaws as a function of the diameter of the bar used in the machine tool situated downstream from the device.

Theoretically, this poses no problem, but in practice oversights have been observed that lead to drawbacks, in particular in the form of production stops.

Precisely speaking, in the case of increase in the diameter of the bar, the loading of the slicing machine is prevented because the end of the bar of increased diameter meets the jaws without being able to pass through them, and thus cannot be loaded into the machine.

Likewise, in the case of loading of a bar of smaller diameter than that of the pusher, the complete loading of the bar into the slicing machine is prevented because the end of the pusher encounters the jaws without being able to pass through them and thus cannot push the bar completely into the machine.

Likewise, in the case of reduction of the diameter of the bar, when there is a change in the type of pieces to be manufactured in series, the slicing machine is deprived of the action of the alignment device because the bar of decreased diameter can be loaded into the machine without cooperating with the jaws.

One object of the invention is to obtain a loading apparatus equipped with an alignment device which makes it possible to correct a lack of adjustment in the alignment device.

Another object of the invention is to obtain a loading apparatus equipped with an alignment device which makes it possible to deal with the occurrence of vibrations in the bar loaded in the spindle of the machine.

To this end, the invention has as its subject matter a sequential loading apparatus for bars in a rotating machine part. The apparatus being of the type having a device for alignment, on the axis of rotation of the rotating part, of the end of the bar intended to be engaged there, this apparatus being characterized in particular in that the displacement mechanism includes a drive element and a device for control of this drive element. The drive element is controlled as a function of at least one of the parameters which are; the diameter of the bar to be loaded in the machine tool, the diameter of the pusher in a part capable of being engaged in the jaws and the surpassing of a predetermined threshold for vibrations in the bar.

The invention will be better understood from reading the following description, given by way of non-limiting example, with reference to the attached very schematic drawing.

Figure 1:
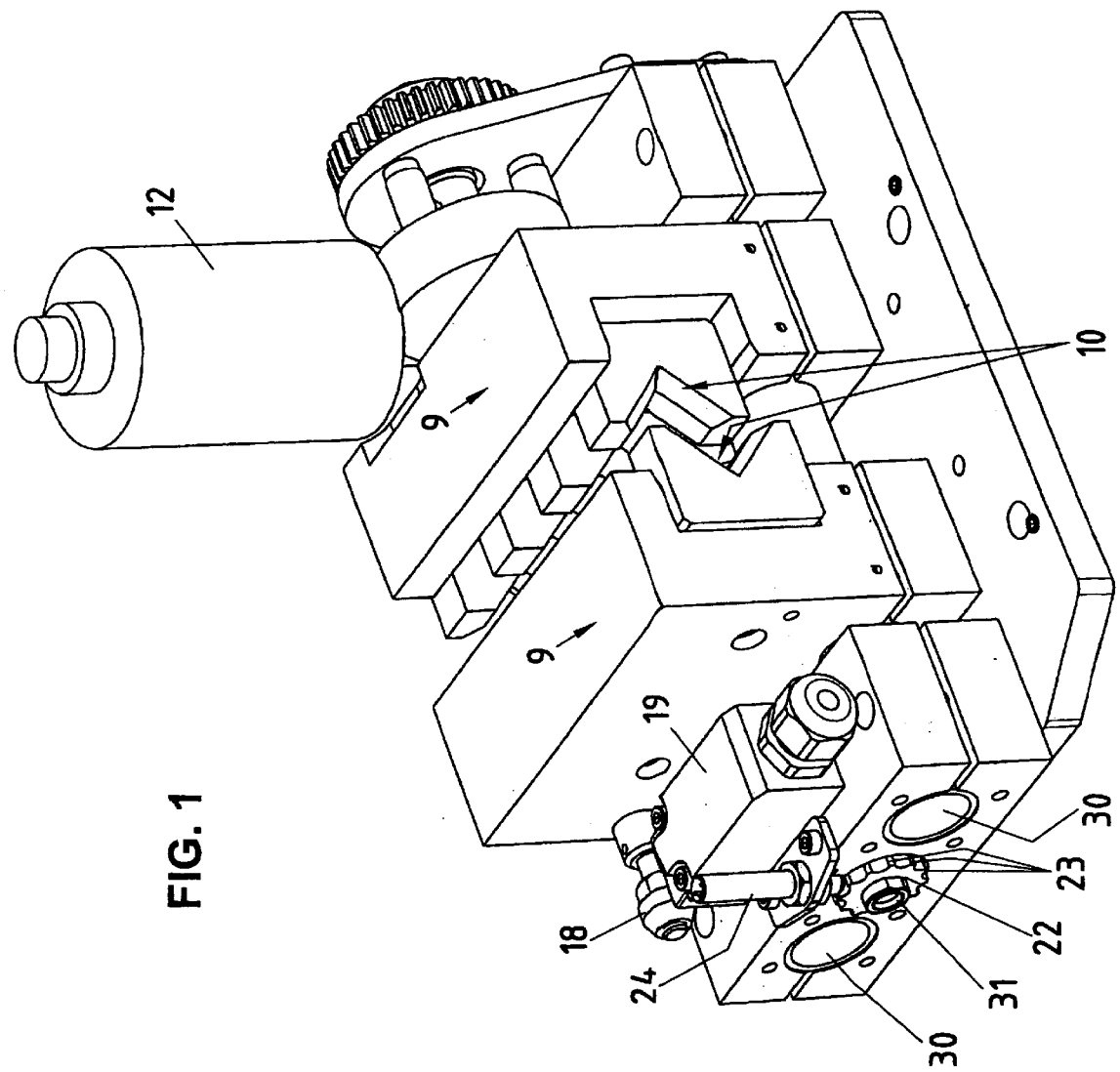
FIG. 1 is a view in perspective of a part of a sequential loading apparatus according to the invention.
Figure 2:
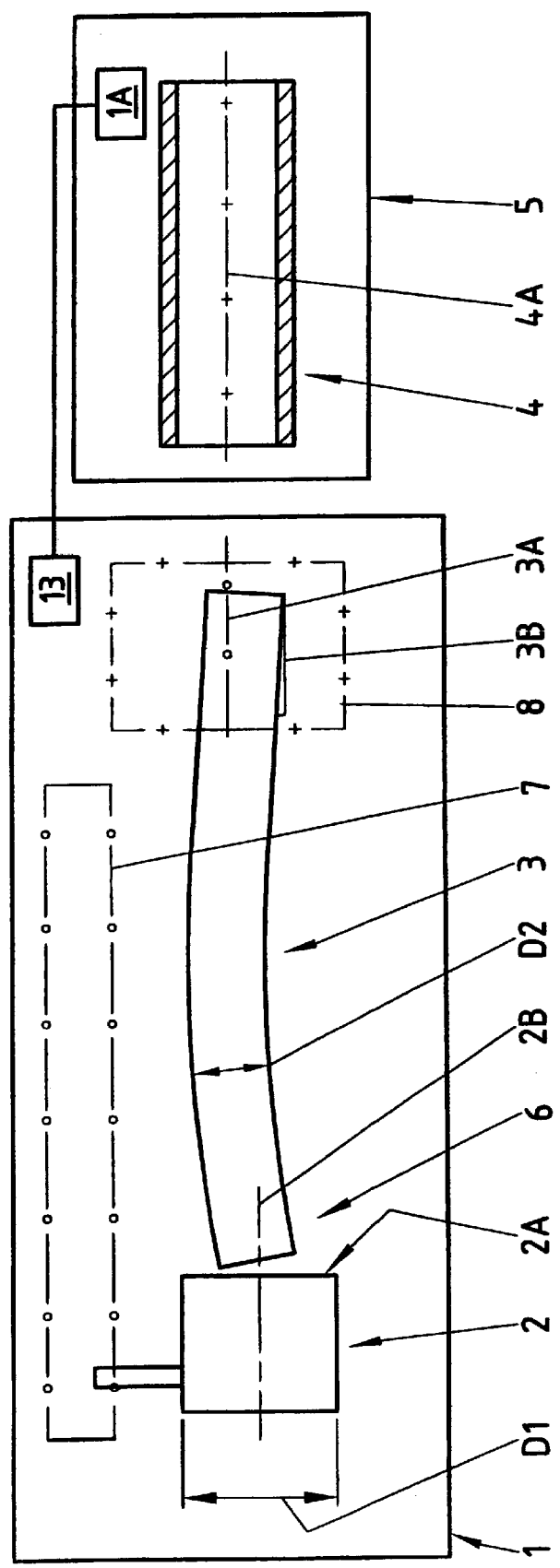
FIG. 2 is an overall view of the sequential loading apparatus according to the invention, and of a machine tool equipped with this apparatus.
Figure 3:
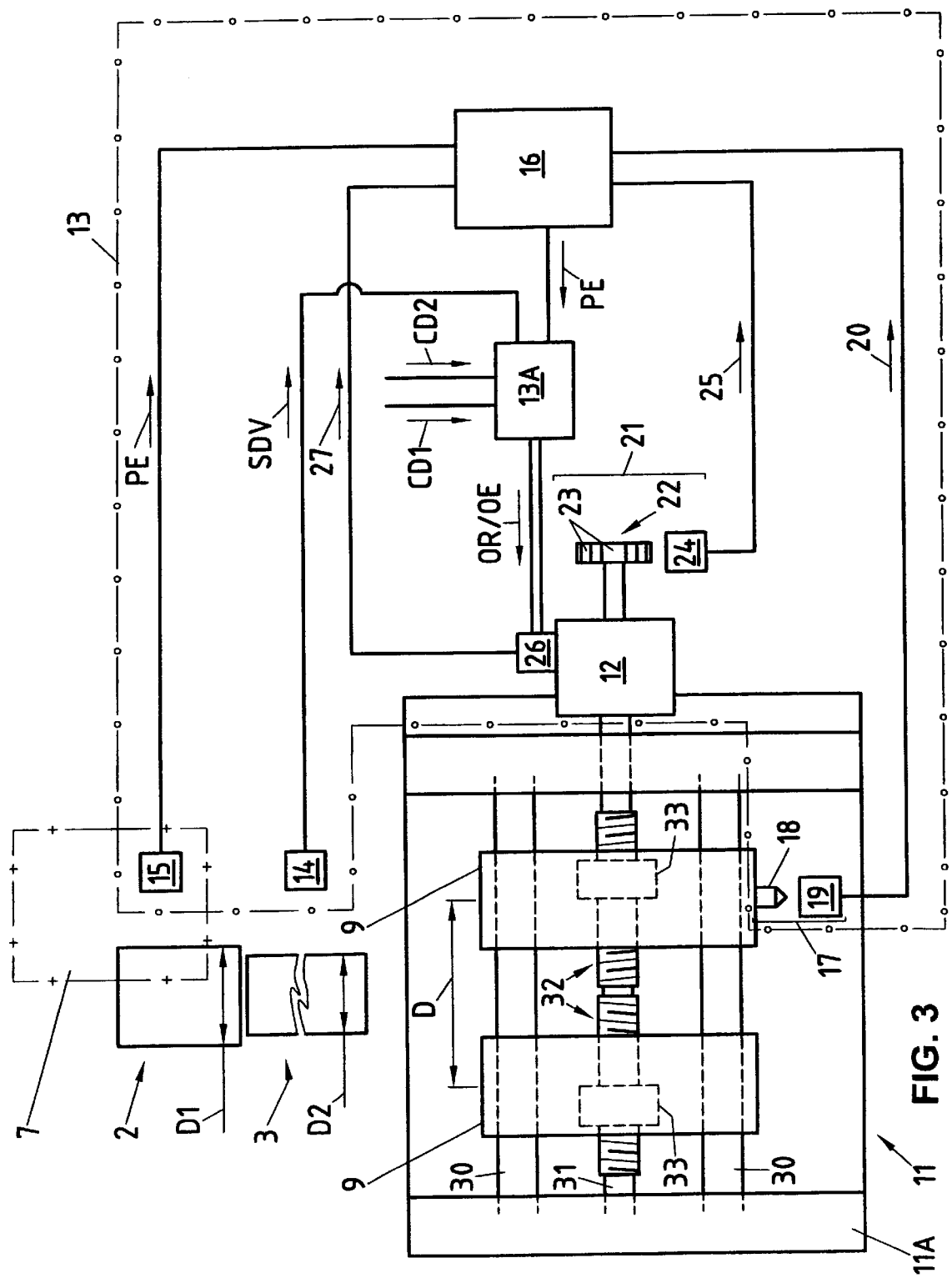
FIG. 3 is a detailed, overall view of a sequential loading apparatus according to the invention.
Figure 4:
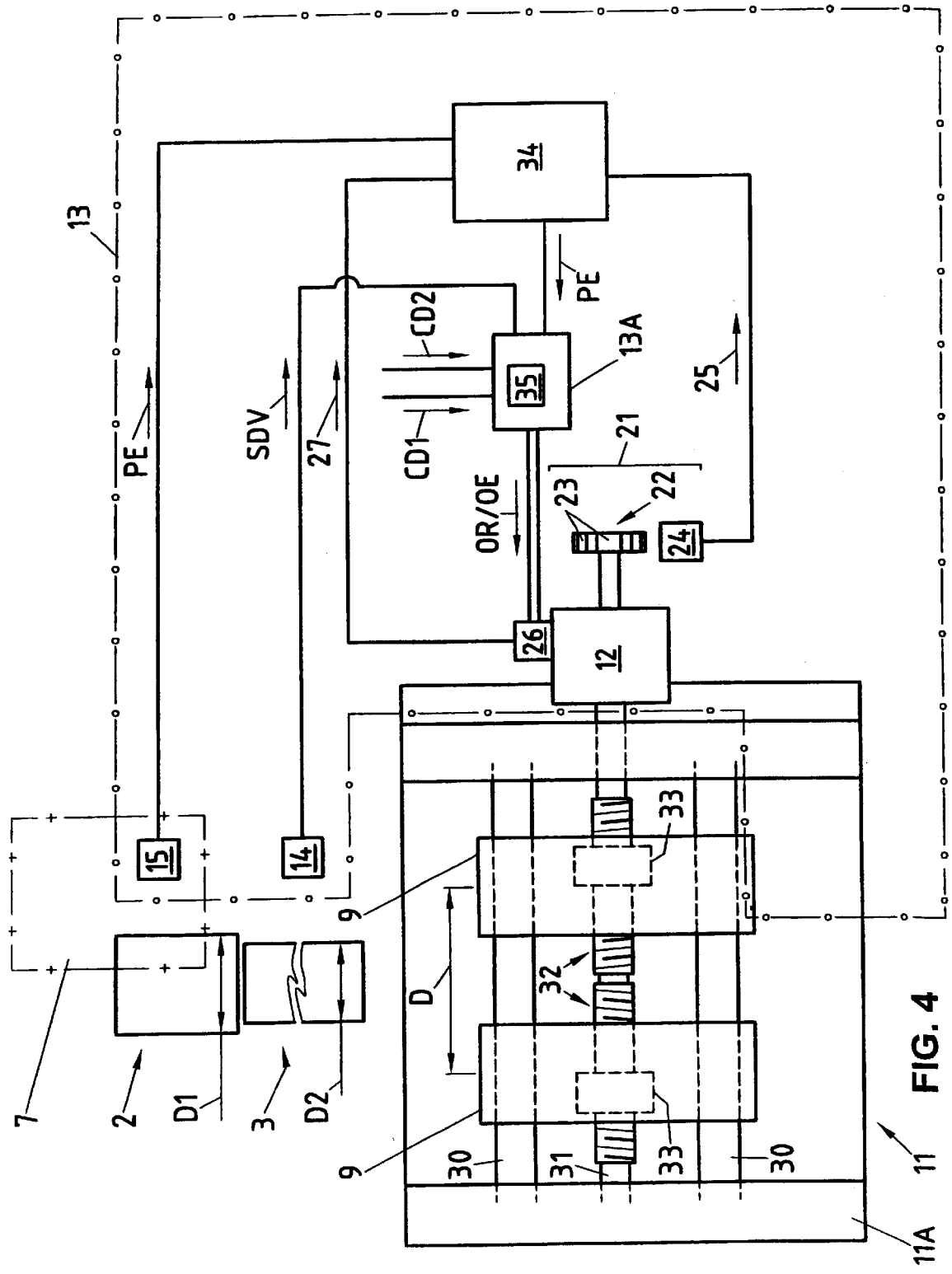
FIG. 4 is an overall view of a variant embodiment of the functional part of the apparatus of FIG. 3.

Referring to the drawings (FIG. 2), one sees an apparatus for sequential loading 1, in particular by means of a pusher 2, of bars 3 into a rotating part 4, such as a spindle, of a machine tool 5, such as a machining lathe.

Designated by the term "pusher" is the active part 2 of the sequential loading apparatus 1, i.e. a substantially cylindrical body in rotation, of predetermined diameter D1, on the one hand having an end face 2A intended to push against one 6 of the ends, referred to as the rear end, of the bar 3 to be pushed, and, on the other hand, receiving the action of a drive element 7 of displacement in translation along an axis 2B aligned with that 4A of the rotating part 4.

The drive element 7 of displacement in translation can be of any known type.

The sequential loading apparatus 1 of bars 3 into the rotating part 4, called the spindle, includes a device 8 for alignment, on the axis of rotation 4A of the rotating part 4, of the longitudinal axis 3A of at least one part 3B of the bar 3 which is situated immediately upstream from this rotating part 4.

Although this is not visible in an obvious way in the drawings, the alignment device 8 makes it possible to ensure and/or to perfect the alignment, with the axis 4A of the spindle 4, of a substantial part of the bar which is engaged in this spindle.

In this way, the vibrations caused by the lack of straightness of the bars 3 (consciously exaggerated in the drawing) do not spread to the spindle 4 of the machine tool 5, and the deficiencies in machining which would result from these vibrations can thus be avoided.

The alignment device 8 includes two jaws 9 which, having bearing surfaces 10, such as bearing surfaces in V-shape, able to define a cylindrical support around a part 3B of bar 3, i.e. on a portion of the length of the latter, are supported by a mechanism 11, referred to as the displacement mechanism, enabling counter-displacements of these jaws 9, i.e. displacements causing the spacing apart or the bringing closer together of the said jaws.

The displacement mechanism 11 is connected to a massive support 11A, such as the structure of the sequential loading apparatus 1.

The mechanism 11 of displacement of the jaws 9 makes it possible to adjust the position of the said jaws 9 as a function of the diameter of the bar 3 intended to be used in the machine tool.

It is to be noted that the displacement mechanism 11 includes; a drive element 12, and a device 13 for control of this drive element 12. The drive element 12 is controlled as a function of at least one of the parameters D1, D2 which are; the diameter D2 of the bar to be loaded in the machine tool 5, the diameter D1 of the pusher 2 in a part capable of being engaged in the jaws 9 and the surpassing of a predetermined threshold for vibrations in the bar 3.

Respecting these technical features makes it possible, in particular, to ensure the loading of the machine tool 5 in the case of increase in bar 3 diameter, for example when there is a change in the type of pieces to be manufactured in series.

In effect, the end of the bar 3 of increased diameter no longer encounters the jaws 9 without being able to pass through them, and can therefore be loaded into the machine 5.

Likewise, in the case of reduction in bar 3 diameter, when there is a change in type of pieces to be manufactured in series, the machine tool 5 is no longer deprived of the action of the alignment device 8 because the bar 3 of reduced diameter can be loaded into the machine 5 while cooperating with the jaws 9 owing to the adjustment of their position.

It is likewise to be noted that the control device 13 itself includes at least one functional unit 13A, itself able to receive, at least indirectly, one of the input data CD1, CD2, SDV which reflect the value CD2 of the diameter D2 of the bar 2 to be loaded into the machine tool 5, the value CD1 of the diameter D1 of the pusher 2 in a part capable of being engaged in the jaws 9, the value SDV of the signal of surpassing of a predetermined threshold for vibrations in the bar 3, and a piece of information, such as a signal PB relating to the actual position of the jaws 9, i.e. to the diameter D of the cylindrical body in revolution that can be inscribed between these jaws 9.

It is also to be noted that the control device 13 includes at least one functional unit 13A, itself able to make use of these parameters to produce at least a control sequence OR/OB for the drive element 12 and induce the displacement of the jaws 9 in order to obtain at least one of the capabilities which are; the creation of a cylindrical rotational guide support around the bar 3, the creation of a cylindrical temporary clamping support around the bar 3 until disappearance of the signal SDV of surpassing of the predetermined vibration threshold.

One skilled in the art will be able to determine the value for temporary clamping.

The clamping can be achieved through a reduction of the play in guiding in rotation.

In a noteworthy way, the control device 13 includes an element 14 for detecting the surpassing of a predetermined vibration threshold and for producing a signal SDV relating to the surpassing of this threshold.

This element 14 for detecting the surpassing of a predetermined vibration threshold can be of any known type, and can be situated in any suitable place.

In a noteworthy way, the control device 13 includes an element 15 for monitoring the position of the pusher 2 with respect to the jaws 9 in such a way as to generate at least a command OE for spacing of the jaws 9 so as to induce a displacement of these jaws 9 when the end of this pusher 2 has to be introduced between the said jaws 9, in particular when an adaptation of diameter is required.

The element 15 for monitoring the position of the pusher 2 with respect to the jaws 9 is preferably disposed in the loading apparatus 1, and connected to the drive element 7 for displacement in translation of the pusher, for example.

In the case of loading of a bar 3 of diameter less than that of the said pusher 2, the complete loading of the bar 3 into the machine tool 5 is no longer prevented owing to the fact that the end of the pusher 2 no longer encounters the jaws 9 frontally.

The pusher 2 can thus pass through the alignment device 8, and, to the extent that its displacement allows it, can push the bar 3 into the machine 5.

In a noteworthy way, the control device 13 includes a functional unit 16, 35 for determining at least indirectly the value of the diameter D inscribed in the jaws 9, i.e. the value of the diameter of a cylindrical body in rotation which could be placed between the jaws 9, taking into account their relative position.

In a noteworthy way, the control device 13 includes a functional unit 17, referred to as the first functional unit, made up of a position indicator 18 which defines a reference position and a sensor 19 able to produce a signal 20 of detection of the position indicator 18, said position indicator 18 and sensor 19 being disposed so as to be movable with respect to one another upon displacement of the jaws 9 and cooperating only in a selected position of these jaws 9 corresponding to a predetermined inscribed diameter D.

The control device 13 also includes a functional unit 21, referred to as the second functional unit, made up of an element 22 bearing a plurality of position indicators 23 which are disposed at a predetermined pitch P1 and a sensor 24 for detecting one of these indicators 23 able to produce a signal for each individual indicator, the element 22 and the sensor 24, being disposed so as to be movable with respect to one another upon displacement of the jaws 9 and such that the pitch P1 between the indicators 23 corresponds to a known value for displacement of the jaws 9, and in so doing, to this end, the emitting of two consecutive signals 25 by the sensor 24 indicates the displacement of the jaws 9 by a predetermined value.

The control device 13 includes a functional unit 26, referred to as the third functional unit, for producing a signal 27 dependent upon the direction of displacement of the jaws 9 and a functional unit 16, referred to as the fourth functional unit, for making use of the signal 20 of detection of the reference position as well as consecutive signals 25 relating to the displacement of the jaws 9 by a predetermined value and of the signal 27 indicating the direction of displacement of these jaws 9, and this in such a way as to produce a signal PE reflecting the actual position of the jaws 9 and thus the value of the diameter D inscribed between the jaws 9.

This functional unit 16 for determining, at least indirectly, the value of the diameter D inscribed in the jaws 9, makes it possible for the control device to control the displacement of the jaws 9 for adapting their position as a function of the diameter of the bars 3 placed in the sequential loading apparatus 1.

Thus, after an operator has input into the control device 13 an input data CD1, reflecting the value of the diameter of the bars 3, and an input value CD2, reflecting the diameter of the pusher 2, the control device 13 can manage automatically the displacement of the jaws 9 because it can be informed about the actual position of these jaws 9.

The device 13 for control of the mechanism 11 for displacement of the jaws 9 is preferably connected to a device 1A for control of the machine tool 5.

The mechanism 11 for displacement of the jaws 9 brings into play slides 30 for guiding in translation which, at least indirectly supported by a massive structural element 11A, such as the framework of the loading apparatus 1, cooperate with bearing surfaces, themselves connected to the jaws 9 for their guiding in translation, a shaft 3+1 which, guided in rotation and immobilized in translation relative to the support element 11A, has two longitudinal, threaded zones 32 of predetermined, but opposite, pitch, and two nuts 33, each engaged on one of these threaded zones 32 and connected to one of the jaws 9 in such a way that a rotation of the shaft 31 of predetermined value causes a displacement of the jaws 9 of predetermined proportional value.

In a noteworthy way, the mechanism 11 for displacement of the jaws 9 includes; a drive element 12 for control of the rotation of the threaded shaft 31, a wheel 22 which, at least indirectly connected in rotation to the threaded shaft 31, bears a plurality of position indicators 23 disposed at a predetermined circumferential pitch P1, a functional unit 17, referred to as the first functional unit, having a pin 18, constituting the reference position indicator, and a sensor 19 for detecting this pin 18 and for producing a signal 20 of detection of the reference position, one of these elements 18, 19 being fixed to one of the jaws 9 and the other being fixed in such a way as to cooperate only in a selected position of the jaws 9 corresponding to a predetermined inscribed diameter D and said functional unit 21, referred to as the second functional unit, having a sensor 24 for detecting one of these indicators 23 and for producing a signal 24 of detection of each indicator 23 in such a way that the circumferential pitch P1 between two consecutive indicators 23 corresponds to a predetermined angular value for the rotation of the shaft 31 and thus to a known value for displacement of the jaws 9.

The sensor 19 of the functional unit 17, referred to as the first functional unit, is preferably electrical switch 19 and the pin 18 is a cam for actuation of this switch.

Preferably, on the one hand, the wheel 22 bears a plurality of peripheral teeth 23 which, made of magnetic metal, each constitute an indicator 23, and, on the other hand, the sensor 24 consists of an induction-type sensor.

The wheel 24 is preferably made entirely out of magnetic metal.

This type of construction of the functional unit 21, referred to as the second functional unit, is advantageous because it is especially robust.

The drive element 12 for control of the rotation of the threaded shaft 31 is preferably a direct current (DC) electrical motor 12, and the third functional unit 20, of production of a signal 27 depending upon the direction of displacement of the jaws 9, makes use of the polarity of a feed current to the electric supply terminals of this motor to create a signal 27 reflecting the direction of control of the motor and thus the direction of displacement of the jaws.

The alignment device 8 is of course controlled in such a way that the jaws ensure, in normal time, the sought-after guiding by braking the rotation of the bars as little as possible.

In another noteworthy embodiment, the control device 13 has a functional unit 21, referred to as the second functional unit, made up of an element 22 bearing a plurality of position indicators 23 which are disposed at a predetermined pitch P1 and a sensor 24 for detecting one of these indicators 23 able to produce a signal for each individual indicator, the element 22 and the sensor 24, being disposed so as to be movable with respect to one another upon displacement of the jaws 9 and such that the pitch P1 between the indicators 23 corresponds to a known value for displacement of the jaws 9, and in so doing, to this end, the emitting of two consecutive signals 25 by the sensor 24 indicates the displacement of the jaws 9 by a predetermined value and a functional unit 26, referred to as the third functional unit, for producing a signal 27 dependent upon the direction of displacement of the jaws 9.

The control device 13 also has a functional unit 34, referred to as the fifth functional unit which controls the following functions; opening of the jaws 9 into maximal position, prior to displacement of a bar 3 toward the jaws 9, placement of the bar 3 between the jaws 9, closing of the jaws 9 until they come into contact with the bar 3, without causing notable clamping and opening of the jaws 9 to make adjustment for a predetermined operational play.

The control device 13 also has a functional unit 35, referred to as the sixth functional unit, in order, upon displacement of the jaws 9, to make use of at least one of the input data CD1, CD2, one CD2 reflecting the value of the diameter D2 of the bar 2 to be loaded into the machine tool 5, and the other CD2 reflecting the diameter D1 of the pusher 2 in a part capable of being engaged between these jaws 9, the consecutive signals 25 relating to the displacement of the jaws 9 by a predetermined value and of the signal 27 indicating the direction of displacement of these jaws 9 and work out a signal PE relating to the actual position of the jaws 9, i.e. to the diameter D of the cylindrical body in rotation engaged between these jaws 9 as a function of the input data value CD2 reflecting the said diameter and of the jaws' actual taking up contact with the bar 3.

For example, the functional unit 34, referred to as the fifth functional unit, which controls, in particular, the function of closing of the jaws 9 until they come into contact with the bar 3, without causing notable clamping, includes an element for monitoring the feed current of the motor 12 in such a way as to detect the increase of torque which results from the contact of the jaws with the bar and to stop the feed of the said motor 12.

What is claimed is:

1. A loading apparatus for sequential loading bars in a rotating spindle of a machine tool, by means of a pusher, the loading apparatus comprising an alignment device for alignment of an end of each loaded bar on an axis of a spindle of a machine tool, said alignment device further comprising jaws having bearing surfaces able to define a cylindrical support around the bars, and supported by a mechanism allowing their counter-displacements, wherein said mechanism for displacement of the laws of the apparatus further comprises:
- a drive element;
- a control device for control of the drive element that controls the drive element as a function of the surpassing of a predetermined threshold for vibrations in the bar and at least one of a diameter of the bar to be loaded in the machine tool and a diameter of the pusher in a part capable of being engaged in the jaws; and
- a functional unit for determining at least indirectly the value of the diameter inscribed in the jaws, wherein the functional unit includes:
  - a first functional sub-unit, made up of a position indicator which defines a reference position and a sensor able to produce a signal of detection of the position indicator, said position indicator and sensor being disposed so as to be movable with respect to one another upon displacement of the jaws and cooperating only in a selected position of these jaws corresponding to a predetermined inscribed diameter;
  - a second functional sub-unit, made up of an element bearing a plurality of position indicators which are disposed at a predetermined pitch and a further sensor for detecting one of these indicators able to produce a signal for each individual indicator, the element and the said farther sensor, being disposed so as to be movable with respect to one another upon displacement of the jaws and such that the pitch between the indicators corresponds to a known value for displacement of the jaws, and in so doing, to this end, the emitting of two consecutive signals by the said further sensor indicates the displacement of the jaws by a predetermined value;
  - a third functional sub-unit, for producing a signal dependent upon the direction of displacement of the jaws; and
  - a fourth functional sub-unit, for using the signal of detection of the reference position as well as consecutive signals relating to the displacement of the jaws by a predetermined value and of the signal indicating the direction of displacement of these jaws, and this in such a way as to produce a signal reflecting the actual position of the jaws and thus the value of the diameter inscribed between the jaws.

2. The apparatus according to claim 1, comprising a mechanism for displacement of jaws further comprising:
- a shaft which, guided in rotation and immobilized in translation relative to a support element, has two longitudinal, threaded tones of predetermined, but opposite, pitch;
- two nuts, each engaged on one of these threaded zones and connected to one of the jaws in such a way that a rotation of the shaft of predetermined value causes a displacement of the jaws of predetermined proportional value;
- a drive element for control of the rotation of the threaded shaft;
- a wheel which, at least indirectly connected in rotation to the threaded shaft, bears a plurality of position indicators disposed at a predetermined circumferential pitch; and
- a second functional unit having a pin constituting the reference position indicator and a sensor for detecting this pin and for producing a signal of detection of the reference position, one of these elements being fixed to one of the jaws and the other being fixed in such a way as to cooperate only in a selected position of the jaws corresponding to a predetermined inscribed diameter, said second functional unit having a further sensor for detecting one of these indicators and for producing a signal of detection of each indicator in such a way that the circumferential pitch between two consecutive indicators corresponds to a predetermined angular value for the rotation of the shaft and thus to a known value far the displacement of the jaws.

3. The apparatus according to claim 2, wherein said drive element for control of the rotation of the threaded shaft is an direct current electric motor, and said third functional unit, for producing a signal depending upon the direction of displacement of the jaws, makes use of the polarity of a feed current to electrical supply terminals of this motor to form the said signal reflecting the direction of control of the motor and thus the direction of displacement of the jaws.

4. The apparatus according to claim 2, wherein its wheel bears a plurality of peripheral teeth which, made of magnetic material, each constitute an indicator, and moreover the said further sensor is an inductive-type sensor.

5. A loading apparatus for sequential loading bars in rotating spindle of a machine tool, by means of a pusher, the loading apparatus comprising an alignment device for alignment of an end of each loaded bar on an axis of a spindle of a machine tool, said alignment device further comprising jaws having bearing surfaces able to define a cylindrical support around the bars, and supported by a mechanism allowing their counter-displacements, wherein said mechanism for displacement of the jaws of the apparatus further comprises:
- a drive element;
- a control device for control of the drive element that controls the drive element as a function of the surpassing of a predetermined threshold for vibrations in the bar and at least one of a diameter of the bar to be loaded in the machine tool and a diameter of the pusher in a part capable of being engaged in the jaws; and
- a functional unit for determining at least indirectly the value of the diameter inscribed in the jaws, wherein the functional unit includes:
  - a first functional sub-unit, made up of an element bearing a plurality of position indicators which are disposed at a predetermined pitch and a further sensor for detecting one of these indicators able to produce a signal for each individual indicator, the element and the said further sensor, being disposed so as to be movable with respect to one another upon displacement of the jaws and such that the pitch between the indicators corresponds to a known value for displacement of the jaws, and in so doing, to this end, the emitting of two consecutive signals by the said further sensor indicates the displacement of the jaws by a predetermined value,
  - a second functional sub-unit, for producing a signal dependent upon the direction of displacement of the jaws,
  - a third functional sub-unit which controls the following functions:
    (a) opening of the jaws into maximal position, prior to displacement of a bar toward the jaws,
    (b) placement of the bar between the jaws, (c) closing of the jaws until they come into contact with the bar, without causing notable clamping, (d) opening of the jaws to make adjustment for a predetermined operational play, a fourth functional sub-unit, in order, upon displacement of the jaws, to use:

(a) at least one of the input data, one reflecting the value of the diameter of the bar to be loaded into the machine tool, and the other reflecting the diameter of the pusher in a part capable of being engaged between these jaws, (b) the consecutive signals relating to the displacement of the jaws by a predetermined value and of the signal indicating the direction of displacement of these jaws, and (c) work out a signal relating to the actual position of the jaws.

6. The apparatus according to claim 5, comprising a mechanism for displacement of jaws further comprising:

a shaft which, guided in rotation and immobilized in translation relative to a support element, has two longitudinal, threaded zones of predetermined, but opposite, pitch;

two nuts, each engaged on one of these threaded zones and connected to one of the jaws in such a way that a rotation of the shaft of predetermined value causes a displacement of the jaws of predetermined proportional value;

a drive element for control of the rotation of the threaded shaft;

a wheel which, at least indirectly connected in rotation to the threaded shaft, bears a plurality of position indicators disposed at a predetermined circumferential pitch; and a second functional unit having a pin constituting the reference position indicator and a sensor for detecting this pin and for producing a signal of detection of the reference position, one of these elements being fixed to one of the jaws and the other being fixed in such a way as to cooperate only in a selected position of the jaws corresponding to a predetermined inscribed diameter, said second functional unit having a further sensor for detecting one of these indicators and for producing a signal of detection of each indicator in such a way that the circumferential pitch between two consecutive indicators corresponds to a predetermined angular value for the rotation of the shaft and thus to a known value for the displacement of the jaws.

7. The apparatus according to claim 5, wherein said drive element for control of the rotation of the threaded shaft is a direct current electric motor, and said third functional unit, for producing a signal depending upon the direction of displacement of the jaws, makes use of the polarity of a feed current to electrical supply terminals of this motor to form the said signal reflecting the direction of control of the motor and thus the direction of displacement of the jaws.

* * * * *